US009809732B2

(12) United States Patent
Kelch

(10) Patent No.: US 9,809,732 B2
(45) Date of Patent: *Nov. 7, 2017

(54) TWO-COMPONENT POLYURETHANE COMPOSITIONS, IN PARTICULAR SUITABLE FOR USE AS VISCOPLASTIC STRUCTURAL ADHESIVES

(71) Applicant: SIKA TECHNOLOGY AG, Baar (CH)

(72) Inventor: Steffen Kelch, Oberengstringen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,190

(22) PCT Filed: Sep. 6, 2013

(86) PCT No.: PCT/EP2013/068433
§ 371 (c)(1),
(2) Date: Mar. 13, 2015

(87) PCT Pub. No.: WO2014/040916
PCT Pub. Date: Mar. 20, 2014

(65) Prior Publication Data
US 2015/0247073 A1    Sep. 3, 2015

(30) Foreign Application Priority Data

Sep. 14, 2012 (EP) .................................... 12184554

(51) Int. Cl.
| C09J 175/06 | (2006.01) |
| B32B 7/12 | (2006.01) |
| B32B 37/12 | (2006.01) |
| C08G 18/76 | (2006.01) |
| C08G 18/32 | (2006.01) |
| C08G 18/36 | (2006.01) |

(52) U.S. Cl.
CPC .............. *C09J 175/06* (2013.01); *B32B 7/12* (2013.01); *B32B 37/12* (2013.01);
(Continued)

(58) Field of Classification Search
CPC .... C09J 175/06; C08G 18/3206; C08G 18/36; C08G 18/7621; C08G 18/7671;
(Continued)

(56) References Cited

U.S. PATENT DOCUMENTS 4,582,891 A * 4/1986 Maki et al. .................. 528/74.5
4,877,829 A * 10/1989 Vu et al. ...................... 524/729
(Continued)

FOREIGN PATENT DOCUMENTS

| CN | 101151290 A | 3/2008 |
| DE | 4401572 A1 | 7/1995 |

(Continued)

OTHER PUBLICATIONS

Feb. 24, 2014 International Search Report issued in International Patent Application No. PCT/EP2013/068433.
(Continued)

*Primary Examiner* — Thao T Tran
(74) *Attorney, Agent, or Firm* — Oliff PLC

(57) ABSTRACT

The invention concerns a two-component polyurethane composition including a polyol component K1 and a polyisocyanate component K2, the polyol component K1 including castor oil A1 and 1,2,3-propane triol A2, and the polyisocyanate component K2 including at least one aromatic polyisocyanate B1, the ratio in weight percent of (A1/A2) being between 4 and 50 and the ratio of all NCO groups of the aromatic polyisocyanates B1 to all the OH groups totaling (A1+A2)=1.15:1-85:1, and the total of all the OH groups of (A1+A2) being >93% of the total of all the OH groups of the two-component polyurethane composition, characterized by controllable hydrolytic degradability.

10 Claims, 3 Drawing Sheets

(52) U.S. Cl.
CPC ......... *C08G 18/3206* (2013.01); *C08G 18/36* (2013.01); *C08G 18/7621* (2013.01); *C08G 18/7671* (2013.01); *B32B 2037/1253* (2013.01); *B32B 2375/00* (2013.01); *Y10T 428/31551* (2015.04)

(58) Field of Classification Search
CPC ........ B32B 2037/1253; B32B 2375/00; B32B 37/12; B32B 7/12; Y10T 428/31551
USPC ................. 428/423.1; 156/60; 528/74.5, 85
See application file for complete search history.

(56) References Cited

U.S. PATENT DOCUMENTS 9,587,152 B2 * 3/2017 Kelch .................... C09J 175/06

| | | |
|---|---|---|
| 2002/0157789 A1 | 10/2002 | Imai et al. |
| 2004/0138402 A1 | 7/2004 | Thiele et al. |
| 2007/0175793 A1 | 8/2007 | Narine et al. |

FOREIGN PATENT DOCUMENTS

| | | |
|---|---|---|
| EP | 0344512 A2 | 12/1989 |
| JP | S59-197466 A | 11/1984 |
| JP | S60-147426 A | 8/1985 |
| JP | S60-166353 A | 8/1985 |
| JP | H03-119020 A | 5/1991 |
| WO | 02/066572 A1 | 8/2002 |

OTHER PUBLICATIONS

Aug. 29, 2016 Notification of First Office Action issued in Chinese Application No. 201380056316.6.
Jun. 6, 2017 Office Action issued in Japanese Patent Application No. 2015-531521.

* cited by examiner

TWO-COMPONENT POLYURETHANE COMPOSITIONS, IN PARTICULAR SUITABLE FOR USE AS VISCOPLASTIC STRUCTURAL ADHESIVES

TECHNICAL FIELD

The invention relates to the area of two-component polyurethane compositions, especially the viscoelastic structural two-component-polyurethane adhesives with controllable hydrolytic degradability.

PRIOR ART

Two-component polyurethane adhesives based on polyols and polyisocyanates have long been used. Two-component polyurethane adhesives have the advantage that they cure rapidly after mixing and therefore can quickly take up and transfer rather high forces. However, high demands in terms of strength and extensibility are imposed on such adhesive for use as structural adhesives, since such adhesives represent elements of load-bearing structures.

In particular, there is a desire for adhesives that exhibit high strength in structural adhesive bonds but nevertheless high extensibility and are also hydrolytically degradable, especially controllably hydrolytically degradable.

PRESENTATION OF THE INVENTION

Therefore the object of the present invention is to provide a two-component polyurethane composition, in particular a structural two-component polyurethane adhesive which with high strength simultaneously has high elongation and is controllably hydrolytically degradable. This is made possible by the two-component polyurethane compositions according to claim 1.

Surprisingly, high strength of the cured material is achieved with the two-component polyurethane composition according to the invention without a loss of elasticity.

Additional aspects of the invention form the subject matter of additional independent claims. Particularly preferred embodiments of the invention are the subject of the dependent claims.

METHODS OF EXECUTING THE INVENTION

Figure 1:
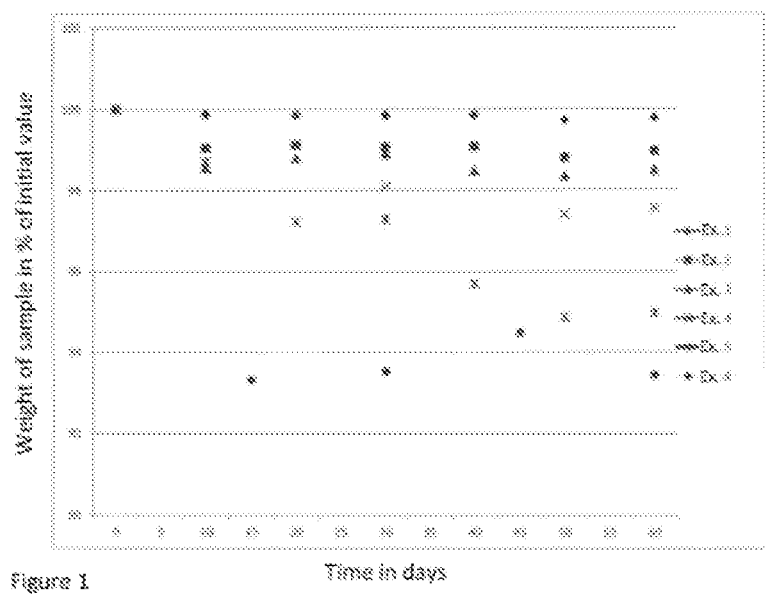
FIG. 1 shows measurement of weight loss during/after hydrolytic degradation in days for Examples 1-6.
Figure 2:
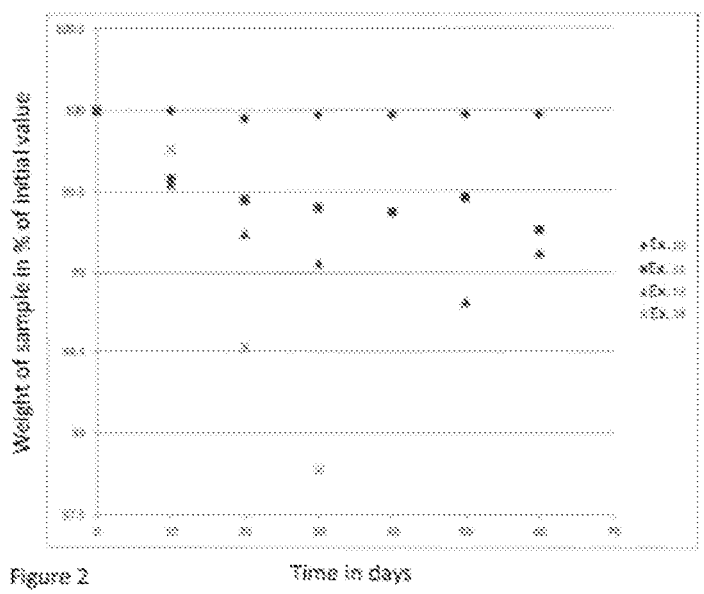
FIG. 2 shows measurement of weight loss during/after hydrolytic degradation in days for Examples 10-12 and 14.

The present invention relates to a two-component polyurethane composition consisting of a polyol component K1 and a polyisocyanate component K2:
wherein the polyol component K1 comprises
castor oil A1 and
1,2,3-propanetriol A2,
and wherein the polyisocyanate component K2 comprises at least one aromatic polyisocyanate B1,
wherein the ratio of the wt.-% of (A1/A2) is 4-50, wherein the ratio of all NCO groups of the aromatic polyisocyanates B1 to all OH groups of the sum of (A1+A2)=1.15:1-0.85:1 and wherein the sum of all OH groups of (A1+A2)≥93% of the sum of all OH groups of the two-component polyurethane compositions.

In the present document, the term "hydrolytically degradable" is defined as degradation by hydrolysis, thus a chemical reaction in which a compound is cleaved by the action of water, as is described in CD Römpp Chemie Lexikon, Version 1.0, Thieme Verlag.

Hydrolytic degradability resulting in weight loss by the cured compositions of ≥0.8 wt.-%, preferably ≥1 wt.-%, particularly preferably ≥2 wt.-% and most preferably ≥4 wt.-%, upon storage in demineralized water at a temperature of 40° C. for a period of 60 days is preferred. The weight loss is measured after drying of the composition under vacuum until constant weight is reached; it is reported as a percentage by weight of the cured composition before storage in demineralized water.

The prefix "poly" in substance names such as "polyol," "polyisocyanate," "polyether" or "polyamine" in the present document indicates that the formula of the respective substance contains more than one of the functional group present in its name per molecule.

The polyol component K1 in this case comprises castor oil A1. The castor oil may contain traces of water. In particular, the water fraction in the castor oil is ≤5 wt.-%, preferably ≤1 wt.-%, particularly preferably ≤0.5 wt.-%.

The term "castor oil" (also called *ricinus* oil) in the present document is defined, in particular, as castor oil as described in CD Römpp Chemie Lexikon, Version 1.0, Thieme Verlag.

Suitable castor oils are, for example, also commercially available under the trade name of Alberdingk® Castor Oil Low Acid 0.7 from Alberdingk Boley, Germany or under the trade name #1 Grade Castor Oil from Vertellus Specialities Inc, USA.

Preferably, castor oil is a natural, renewable raw material and is obtained from the seeds of the castor bean plant (*Ricinus communis*, spurge family). The castor oil can be used in its crude or purified form. The use of castor oil with a reduced content of free fatty acids (low FFA castor oil) proved particularly suitable. Preferably, castor oil with a free fatty acid content of less than 5 wt.-%, preferably between 1 and 4 wt.-%, is used. This is advantageous in that better cross-linking is obtained in this way.

The polyol component K1 comprises 1,2,3-propanetriol (also known as glycerol) A2. Suitable 1,2,3-propanetriols are, for example, commercially available from ecoMotion GmbH, Germany.

The present polyisocyanate component K2 comprises at least one aromatic polyisocyanate B1.

Suitable aromatic polyisocyanates B1 are in particular monomeric di- or triisocyanates, as well as oligomers, polymers and derivatives of monomeric di- or triisocyanates, as well as any mixtures thereof.

Suitable aromatic monomeric di- or triisocyanates are, in particular, 2,4- and 2,6-toluylene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris-(4-isocyanatophenyl) thiophosphate. Preferred aromatic monomeric di- or triisocyanates are derived from MDI and/or TDI.

Suitable oligomers, polymers and derivatives of the monomeric di- and triisocyanates mentioned are derived, in particular, from MDI and TDI. Among these, particularly suitable are commercially available types, TDI oligomers such as Desmodur® IL (from Bayer); also suitable are forms of MDI that are liquid at room temperature (so-called "modified MDI"), which are mixtures of MDI with MDI derivatives, in particular such as MDI carbodiimides or MDI uretone imines, known under trade names such as Desmodur® CD, Desmodur® PF, Desmodur® PC (all from Bayer), as well as mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). In practice, the aforementioned oligomeric polyisocyanates are usually mixtures of substances with different degrees of oligomerization and/or chemical structures. Preferably they have a mean NCO functionality of 2.1 to 4.0.

Preferred aromatic polyisocyanates B1 are MDI and/or TDI, which contain ≥40 wt.-% monomeric MDI and/or monomeric TDI, based on the total weight of MDI and/or TDI.

If polyisocyanate B1 is MDI, in particular MDI comprising ≥40 wt.-% monomeric MDI, this is advantageous, among other reasons, since it enables the attainment of high tensile strength values, high tensile shear strength values and high moduli of elasticity. In addition, the use of MDI is conducive to rapid hydrolytic degradability.

If the polyisocyanate B1 is TDI, in particular TDI comprising ≥40 wt.-% monomeric TDI, this is advantageous, among other reasons, since it enables the attainment of high elongation at break values.

The wt.-% ratio of (A1/A2) is 4-50.

If the wt.-% ratio of (A1/A2) is <4, this is disadvantageous in that in this case the modulus of elasticity is so high that the resulting cured compositions are not suitable as viscoelastic adhesives.

If the wt.-% ratio of (A1/A2) is >50, this is disadvantageous in that in this case the modulus of elasticity is so low that the resulting compositions are not suitable as viscoelastic adhesives.

If the wt.-% ratio of (A1/A2) is 30-4, in particular 20-4, particularly preferably 13-4, most preferably 8-4, this is advantageous in that in this case high tensile strength values are obtained.

If the wt.-% ratio of (A1/A2) is 30-4, in particular 20-4, particularly preferably 13-4, most preferably 8-4, this is advantageous in that in this case high moduli of elasticity are obtained.

If the aromatic polyisocyanate B1 is MDI and if the wt.-% ratio of (A1/A2) is 50-13, in particular 50-20, this is advantageous in that in this case high elongation at break values are obtained.

If the aromatic polyisocyanate B1 is TDI and if the wt.-% ratio of (A1/A2) is 30-4, in particular 13-4, this is advantageous in that in this case high elongation at break values are obtained.

If the wt.-% ratio of (A1/A2) is 30-4, in particular 20-4, particularly preferably 13-4, most preferably 8-4, this is conducive to more rapid hydrolytic degradability.

If the wt.-% ratio of (A1/A2) is 30-8, this is conducive to a chronologically constant and thus readily controllable and monitored hydrolytic degradability.

If the wt.-% ratio of (A1/A2) is 8-4, this is conducive to a high initial degradability, in particular a high initial degradability within the first 15 days.

The ratio of all NCO groups of the aromatic polyisocyanates B1:all OH groups of the sum of (A1+A2) is 1.15:1-0.85:1. Preferably the ratio of all NCO groups of the aromatic polyisocyanates B1:all OH groups of the sum of (A1+A2) is 1.1:1-0.9:1. The ratios presented in the preceding refer to the molar ratios of the groups mentioned.

Figure 3:
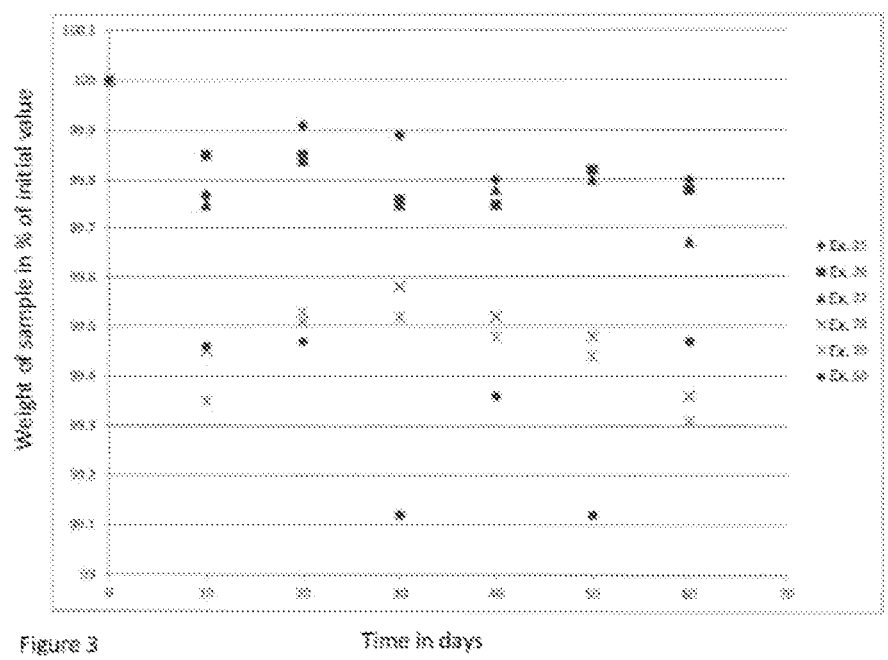
FIG. 3 shows measurement of weight loss during/after hydrolytic degradation in days for Examples 25-29 and 50.

In the two-component polyurethane composition, the sum of all OH groups of (A1+A2) is ≥93% of the sum of all OH groups of the two-component polyurethane composition. If the polyol component K1 contains more than 7% OH groups (that do not originate from (A1+A2)), based on the sum of all OH groups of the two-component polyurethane composition, this leads to inadequate hydrolytic degradability, as is apparent for example in Table 6 and FIG. 3 from Example 50 with a value of about 8.6% (OH groups that do not originate from (A1+A2)).

Preferably in the two-component polyurethane composition the sum of all OH groups of (A1+A2) is ≥95%, in particular ≥98%, particularly preferably ≥99%, most preferably ≥99.5%, of the sum of all OH groups of the two-component polyurethane composition. This is conducive to better hydrolytic degradability.

Preferably the two-component polyurethane composition is essentially free from OH groups that do not originate from (A1+A2). The term "essentially free" in this case means that the sum of the OH groups that do not originate from (A1+A2) is ≤5%, in particular ≤2%, particularly preferably ≤1%, and most preferably ≤0.5%, based on the sum of all OH groups of the two-component polyurethane composition. This is conducive to better hydrolytic degradability.

Preferably the two-component polyurethane composition is essentially free from OH groups of the following substances:

Polyether and/or polyester polyols.
Low-molecular-weight polyols with a molecular weight of 120 to 3000 g/mol (with the exception of 1,2,3-propanetriol), in particular;
Low-molecular-weight aliphatic triols with a molecular weight of 120 to 2000 g/mol (with the exception of 1,2,3-propanetriol).
Various types of such low-molecular-weight aliphatic triols exist. For example, they may contain urethane and/or urea and/or ether groups. The shape of the triols can differ widely. For example, star-shaped or comb-shaped triols are possible. It is also possible for both primary and secondary hydroxyl groups to be present in the triol. For example, the low-molecular-weight aliphatic triols mentioned may be obtained from an aliphatic triisocyanate, in particular an isocyanurate, which is formed from three diisocyanate molecules, in an excess of aliphatic diols, in particular of polyether diols, optionally by further extension with aliphatic diisocyanates and aliphatic diols. Further examples of low-molecular-weight aliphatic triols can be obtained from low-molecular-weight aliphatic triols, for example trimethylolpropane or glycerol, and an aliphatic diisocyanate, and subsequent reaction with am aliphatic diol. Additional examples of low-molecular-weight aliphatic triols are products of an alkoxylation reaction of low-molecular-weight aliphatic triols, for example trimethylolpropane or glycerol.
Low-molecular-weight diols with a molecular weight of 120 to 2000 g/mol.
Low-molecular-weight polyols with 5 to 8 hydroxyl groups with a molecular weight of 120 to 3000 g/mol. Typically such polyols are sugar alcohols and sugar alcohol-based polyols that have an appropriate number of OH groups, in particular pentitols or hexitols or those based on disaccharides. The corresponding sugars may also be used.

Natural oils (with the exception of castor oil) and natural oils that are reaction products with ketone resins, in particular reaction products of castor oil with ketone resins, especially those sold for example by Bayer under the name of Desmophen® 1150 and by Cognis under the name of Sovermol® 805. In this document "natural oils" are defined as esters of fatty acids with glycerol that are liquid at 23° C. These esters are naturally occurring. However, they can also be produced by synthesis or by industrial or biotechnology methods. The term "fatty acid" comprises all carboxylic acids, the carboxyl groups of which are bound to saturated, unsaturated, branched or unbranched alkyl radicals with more than 9 C atoms.

Preferably the two-component polyurethane composition is essentially free from aliphatic polyisocyanates. The term "essentially free" in this case means that the sum of the NCO groups that do not originate from B1 is ≤5%, in particular ≤2%, particularly preferably ≤1%, and most preferably ≤0.5%, based on the sum of all NCO groups of the two-component polyurethane composition. This is conducive to better hydrolytic degradability. In addition, in most cases it is not possible using aliphatic polyisocyanates to produce a cured product that is suitable as an adhesive. For example, in Examples 15-24 and 30-34 it was not possible, to obtain a cured product within 7 days and produce test specimens from it.

Preferably the fraction of the sum of castor oil A1 and 1,2,3-propanetriol A2 is ≥90 wt.-%, in particular ≥95 wt.-%, particularly preferably ≥99 wt.-%, based on the total weight of the polyol component K1.

Preferably the fraction of the aromatic polyisocyanate B1 is ≥90 wt.-%, in particular ≥95 wt.-%, particularly preferably ≥99 wt.-%, based on the total weight of the polyisocyanate component K2.

Components K1 and K2 are advantageously formulated in such a manner that the volume ratio of components K1 and K2 is between 1:3 and 3:1, in particular between 1:2 and 2:1. Particularly preferably this ratio is approximately 1:1.

Both components K1 and K2 may contain additional constituents, in addition to those already mentioned, such as those known to the person skilled in the art from polyurethane chemistry. These may be present in only one component or in both. Such additional constituents that may be used include, for example, solvents, plasticizers and/or extenders, fillers such as especially carbon black, chalk, talc, barite, phyllosilicates, adhesion promoters such as especially trialkoxysilanes, thixotropic agents such as amorphous silicas, drying agents such as zeolites, and colored pigments.

As the person skilled in the art knows with respect to polyurethane adhesives, during the preparation of the components, in particular in the case of the polyisocyanate component K2, it is necessary to make sure that their constituents are as water-free as possible and the components are handled under exclusion of moisture.

Components K1 and K2 are stored separately before use and are only mixed together during or immediately before use. The components are advantageously present in a package consisting of two chambers separated from one another, specifically in such a manner that the polyol component K1 is present in one chamber and the polyisocyanate component K2 is present in the other chamber. Components K1 and K2 are packed into the chambers of the package and sealed in airtight and moisture-tight.

In an additional aspect the invention covers a package consisting of an outer packing with two chambers separate from one another and a two-component polyurethane composition.

Preferred packages of this type are on one hand, side-by-side dual cartridges or coaxial cartridges in which two tubular chambers are arranged alongside one another or one inside the other and are sealed in airtight and moisture-tight with plungers.

For applications in larger quantities, in particular for applications in industrial manufacturing, components K1 and K2 are advantageously filled into drums or hobbocks and stored. In this case, the components are fed by feed pumps over pipelines into a mixing apparatus such as is usually used for two-component adhesives in industrial manufacturing.

For each package it is important that at least the polyisocyanate component K2 is sealed airtight and moisture-tight, so that both components can be stored for prolonged periods, i.e., typically for more than 6 months.

In an additional aspect, the invention comprises a method for bonding.

The bonding method comprises the following steps:
    mixing the above-described components K1 and K2,
    applying the mixed polyurethane compositions to at least one of the substrate surfaces to be bonded,
    joining them within the open time.
    curing the polyurethane composition.

The mixing typically takes place using static mixers or with the aid of dynamic mixers.

The mixed polyurethane composition is applied to at least one of the substrate surfaces to be bonded. The substrate to be bonded preferably comprises or consists of a biodegradable material. The term "biological degradation" in the present document in particular is defined as biological degradation as described in CD Römpp Chemie Lexikon, Version 1.0, Thieme Verlag.

The substrate to be bonded preferably comprises or consists of an organic material, preferably a renewable organic material, particularly preferably a material based on polysaccharide, for example starch or cellulose, or of polyester material based on renewable raw materials. Preferably it is a cellulose fiber nonwoven material, paper or wood.

Additional possible substrates are metal, plastic, glass or ceramic or fiber-reinforced plastics.

Typically two substrates are present, which are to be bonded together. The joint partner, i.e., the second substrate, to be identical to or different from the first substrate. The adhesive application can be made onto the first and/or the second joint partner. After the adhesive application, the joint partners are joined together within the open time. Following the joining, curing of the polyurethane composition takes place.

In this way bonding of the joint partners takes place, wherein the adhesive joins these joint partners together in a force-fit manner.

The above-described method results in a bonded article which in particular is a bonded article, comprising biodegradable materials as the substrates. Preferably the substrates consist of more than 80 wt.-% biodegradable material. An article of this type is an additional aspect of the invention.

The polyurethane composition is preferably used as a structural adhesive. In an additional aspect, therefore, the invention comprises the use of a two-component polyurethane composition as an adhesive, in particular as a structural adhesive. Particularly preferred is the use as a hydrolytically degradable adhesive, in particular as a hydrolytically degradable structural adhesive.

Preferably such a structural adhesive in the cured state at room temperature has a tensile strength of ≥5 MPa, in particular of ≥6 MPa. Preferably a structural adhesive in the cured state at room temperature has a elongation at break of ≥30%, in particular of ≥60%. Preferably a structural adhesive in the cured state at room temperature has a modulus of elasticity of ≥10 MPa. The mechanical values are measured as described in the examples that follow.

Typical examples for applications of the polyurethane compositions according to the invention are found in outer packagings and composite materials, in particular those based on organic materials, most preferably outer packagings and composite materials (for example sandwich panels with honeycomb cores) based on biodegradable materials. In such cases the cured adhesive is part of a supporting structure and thus forms an important connecting link, with high demands placed on its mechanical properties. The present invention meets these high demands optimally.

The polyurethane composition according to the invention is characterized by hydrolytic degradability, in particular controllable hydrolytic degradability.

EXAMPLES

The compositions 2-6 and 11-14 presented as examples in Table 1 are examples according to the invention, whereas the others are reference examples.

To produce components K1, component A1 (or the component A1' not according to the invention) and, if present, component A2 (or the component A2' or A2" not according to the invention), as well as 1 wt.-% (based on the total weight of components K1) of a drying agent (PURMOL® molecular sieves, Zeochem AG, Switzerland), were weighed in gravimetrically according to the A1/A2 ratio specified in Table 2 and mixed in a SpeedMixer® (DAC 150 FV, Hauschild) for 30 seconds at 3000 rpm.

In Example 50, in addition to component A1, components A1" not according to the invention was added in a weight ratio A1/A1" of 75/20.

Then components K2 (B1-1, B1-2, or B', B", B''', B'''' not according to the invention) according to Table 2 were weighed in gravimetrically to component K1 and mixed in the SpeedMixer for 30 seconds at 3000 rpm. Components K1 and K2 were mixed in a weight ratio of K1:K2 resulting in each case a NCO/OH-ratio of 1.07. Then the mixed compositions were poured into Teflon dishes with a 20 cm diameter to cure and samples with a thickness of 2 mm were obtained from them.

In Table 2 the raw materials used (and shown in Table 1) are marked with an "X"; these were mixed as described above for Examples 1-50. Thus for example to produce Example 2, 65.3 g of castor oil, 1.36 g of 1,2,3-propanetriol and 33.7 g of MDI (including 1 wt.-% of a 1% solution of a catalyst based on bismuth and zinc neodecanoate) were used.

Examples 7-9, upon curing, gave a brittle foam from which it was not possible to produce test specimens. In the case of examples 15-24 and 30-34 it was not possible to obtain a cured product within a period of 7 days and to make test specimens from it. In Table 3, examples in which it was possible to produce a test specimen (TSp) are marked with (+). Examples in which no test specimen (TSp) could be produced are marked with (−).

Measurements

The mixed components K1 and K2 were made into dumbbell shapes according to ISO 527, Part 2, 1B and cured for 24 h at 25° C. and then for 3 h at 80° C.

Following a conditioning time of 24 h at 25° C., modulus of elasticity 1 (elongation range 0.5-5%), modulus of elasticity 2 (elongation range 0.05-0.25%), tensile strength (TS) und elongation at break (EB) of the test specimens produced in this way according to ISO 527 were measured on a Zwick Z020 tensile testing machine at a test temperature of 23° C. and a testing velocity of 200 mm/min. The results are shown in Table 3.

At 20 min after mixing, the mixed components K1 and K2 were applied to KTL-lacquered steel degreased with isopropanol (ZSF1) or onto polyester material extruded into plates (Ecoflex, Ecoflex F BX 7011, BASF Germany (ZSF2) or Ecovio. Ecovio L BX 8145, BASF Germany (ZSF3)), in a layer thickness of 2.0 mm and to an overlapping bonding area of 20×45 mm and cured for 7 days at 23° C. and 50% humidity. The tensile shear strength was determined at a temperature of 23.0° C. with a testing velocity of 20 mm/min according to DIN EN 1465. The results are shown in Table 3.

The hydrolytic degradation took place on samples with a thickness of 2 mm and a diameter of 20 mm in demineralized water at 40° C. for a period of 60 d. The samples to be investigated, after removal from the water, were dried to constant weight at 40° C. and under vacuum. The results are shown in Tables 4-6. The values are based on the weight of the sample in % of the initial value, i.e., the weight before the sample was placed in the demineralized water.

TABLE 1

| Raw materials used. | |
|---|---|
| A1 | Castor oil Alberdingk ® Castor Oil Low Acid 0.7 from Alberdingk Boley, Germany, OH number 165 |
| A1' | Reaction product of castor oil with ketone resin, Desmophen ® 1150, Viverso GmbH, Germany, OH number 155 |
| A1" | Novance PE 3451, polyol based on rapeseed oil, OH number 76, Novance, France |
| A2 | 1,2,3-Propanetriol, ecoMotion GmbH, Germany, OH number 1880 |
| A2' | 1,1,1-Trimethylolpropane (also called trimethylolpropane or 2-(hydroxy-methyl)-2-ethylpropane-1,3-diol) |
| A2" | 1,4-Butanediol |
| B1-1 | MDI (45% monomeric MDI), 4,4'-, 2,4'-diphenylmethane diisocyanate. Desmodur ® VKS 20, Bayer Material Science (including 1 wt.-% catalyst*) |
| B1-2 | Monomeric TDI, 2,4- and 2,6-toluylene diisocyanate. Aldrich, (including 1 wt.-% catalyst*) |
| B' | HDI trimer, Desmodur N 3300, Bayer Material Science, (including 1 wt.-% catalyst*) |
| B" | HDI trimer, Desmodur N 3300, Bayer material Science (including 1 wt.-% catalyst**) |
| B''' | Monomeric IPDI, Vestanat IPDI, Evonik Degussa (including 2 wt.-% catalyst*) |
| B'''' | Monomeric IPDI, Vestanat IPDI, Evonik Degussa (without catalyst) |

*organometallic catalyst based on bismuth and zinc neodecanoate, 1% solution;
**organometallic catalyst based on bismuth and zinc neodecanoate, 35% solution.

TABLE 2

Compositions

| Example | A1/A2* | A1 | A1' | A1" | A2 | A2' | A2" | B1-1 | B1-2 | B' | B" | B''' | B'''' |
|---|---|---|---|---|---|---|---|---|---|---|---|---|---|
| 1 | — | X |  |  |  |  |  | X |  |  |  |  |  |
| 2 | 48.5 | X |  |  | X |  |  | X |  |  |  |  |  |
| 3 | 23.75 | X |  |  | X |  |  | X |  |  |  |  |  |
| 4 | 15.5 | X |  |  | X |  |  | X |  |  |  |  |  |
| 5 | 11.38 | X |  |  | X |  |  | X |  |  |  |  |  |
| 6 | 4.4 | X |  |  | X |  |  | X |  |  |  |  |  |
| 7 | 2.5 | X |  |  | X |  |  | X |  |  |  |  |  |
| 8 | 1.58 | X |  |  | X |  |  | X |  |  |  |  |  |
| 9 | 1.04 | X |  |  | X |  |  | X |  |  |  |  |  |
| 10 | — | X |  |  |  |  |  |  | X |  |  |  |  |
| 11 | 48.5 | X |  |  | X |  |  |  | X |  |  |  |  |
| 12 | 23.75 | X |  |  | X |  |  |  | X |  |  |  |  |
| 13 | 15.5 | X |  |  | X |  |  |  | X |  |  |  |  |
| 14 | 11.38 | X |  |  | X |  |  |  | X |  |  |  |  |
| 15 | — | X |  |  |  |  |  |  |  |  | X |  |  |
| 16 | 48.5 | X |  |  | X |  |  |  |  |  | X |  |  |
| 17 | 23.75 | X |  |  | X |  |  |  |  |  | X |  |  |
| 18 | 15.5 | X |  |  | X |  |  |  |  |  | X |  |  |
| 19 | 11.38 | X |  |  | X |  |  |  |  |  | X |  |  |
| 20 | — | X |  |  |  |  |  |  |  | X |  |  |  |
| 21 | 48.5 | X |  |  | X |  |  |  |  | X |  |  |  |
| 22 | 23.75 | X |  |  | X |  |  |  |  | X |  |  |  |
| 23 | 15.5 | X |  |  | X |  |  |  |  | X |  |  |  |
| 24 | 11.38 | X |  |  | X |  |  |  |  | X |  |  |  |
| 25 | — | X |  |  |  |  |  |  |  |  |  | X |  |
| 26 | 48.5 | X |  |  | X |  |  |  |  |  |  | X |  |
| 27 | 23.75 | X |  |  | X |  |  |  |  |  |  | X |  |
| 28 | 15.5 | X |  |  | X |  |  |  |  |  |  | X |  |
| 29 | 11.38 | X |  |  | X |  |  |  |  |  |  | X |  |
| 30 | — | X |  |  |  |  |  |  |  |  |  |  | X |
| 31 | 48.5 | X |  |  | X |  |  |  |  |  |  |  | X |
| 32 | 23.75 | X |  |  | X |  |  |  |  |  |  |  | X |
| 33 | 15.5 | X |  |  | X |  |  |  |  |  |  |  | X |
| 34 | 11.38 | X |  |  | X |  |  |  |  |  |  |  | X |
| 35 | — |  | X |  |  |  |  | X |  |  |  |  |  |
| 36 | 48.5 |  | X |  | X |  |  | X |  |  |  |  |  |
| 37 | 23.75 |  | X |  | X |  |  | X |  |  |  |  |  |
| 38 | 15.5 |  | X |  | X |  |  | X |  |  |  |  |  |
| 39 | 11.38 |  | X |  | X |  |  | X |  |  |  |  |  |
| 40 | — | X |  |  |  |  |  | X |  |  |  |  |  |
| 41 | 48.5 | X |  |  |  | X |  | X |  |  |  |  |  |
| 42 | 23.75 | X |  |  |  | X |  | X |  |  |  |  |  |
| 43 | 15.5 | X |  |  |  | X |  | X |  |  |  |  |  |
| 44 | 11.38 | X |  |  |  | X |  | X |  |  |  |  |  |
| 45 | — | X |  |  |  |  |  | X |  |  |  |  |  |
| 46 | 48.5 | X |  |  |  |  | X | X |  |  |  |  |  |
| 47 | 23.75 | X |  |  |  |  | X | X |  |  |  |  |  |
| 48 | 15.5 | X |  |  |  |  | X | X |  |  |  |  |  |
| 49 | 11.38 | X |  |  |  |  | X | X |  |  |  |  |  |
| 50 | 37.5 | X |  | X |  |  |  | X |  |  |  |  |  |

*Ratio values are also given if the constituents A1' and A1" not in accordance with the invention were used in place of A1, or if the constituents B1' and B1" not in accordance with the invention were used in place of B1.

TABLE 3

Measurement of mechanical properties.

| Example | TSp (+/−) | TS [MPa] | EB [%] | Modulus of elasticity 1 | Modulus of elasticity 2 | ZSF1 [MPa] | ZSF2 [MPa] | ZSF3 [MPa] |
|---|---|---|---|---|---|---|---|---|
| 1 | + | 2 | 52 | 3 | 2 | 1.5 | 0.6 | 0.9 |
| 2 | + | 5 | 78 | 8 | 7 | n.a. | 0.8 | 1.3 |
| 3 | + | 10 | 74 | 44 | 74 | 5 | 0.9 | 1.5 |
| 4 | + | 10 | 60 | 87 | 126 | n.a. | 1 | 1.5 |
| 5 | + | 10 | 32 | 138 | 212 | n.a. | 1 | 1.5 |
| 6 | + | 13 | 17 | 233 | 413 | n.a. | n.a. | n.a. |
| 7-9 | − |  |  |  |  |  |  |  |
| 10 | + | 2 | 87 | 3 | 2 | n.a. | n.a. | n.a. |
| 11 | + | 2 | 105 | 3 | 3 | n.a. | n.a. | n.a. |
| 12 | + | 5 | 131 | 6 | 6 | n.a. | n.a. | n.a. |
| 13 | + | 6 | 115 | 11 | 14 | n.a. | n.a. | n.a. |
| 14 | + | 8 | 120 | 20 | 30 | n.a. | n.a. | n.a. |
| 15-24 | − |  |  |  |  |  |  |  |

TABLE 3-continued

Measurement of mechanical properties.

| Example | TSp (+/−) | TS [MPa] | EB [%] | Modulus of elasticity 1 | Modulus of elasticity 2 | ZSF1 [MPa] | ZSF2 [MPa] | ZSF3 [MPa] |
|---|---|---|---|---|---|---|---|---|
| 25 | + | 2 | 35 | n.a. | 4 | n.a. | n.a. | n.a. |
| 26 | + | 3 | 37 | n.a. | 6 | n.a. | n.a. | n.a. |
| 27 | + | 3 | 29 | n.a. | 6 | n.a. | n.a. | n.a. |
| 28 | + | 4 | 27 | n.a. | 9 | n.a. | n.a. | n.a. |
| 29 | + | 5 | 21 | n.a. | 17 | n.a. | n.a. | n.a. |
| 30-34 | − | | | | | | | |
| 35-46 | + | n.a. | n.a. | n.a. | n.a. | n.a. | n.a. | n.a. |
| 47 | + | 5 | 87 | 9 | 12 | n.a. | n.a. | n.a. |
| 48 | + | 5 | 74 | 15 | 22 | n.a. | n.a. | n.a. |
| 49 | + | n.a. | n.a. | n.a. | n.a. | n.a. | n.a. | n.a. |
| 50 | + | 3 | 86 | 6 | 10 | n.a. | n.a. | n.a. |

TSp = test specimen (+) or cannot (−) be produced,
n.a. = not measured

TABLE 4

Measurement of weight loss during/after hydrolytic degradation in days (d)

Sample weight as % of initial value

| Time (d) | Ex. 1 | Ex. 2 | Ex. 3 | Ex. 4 | Ex. 5 | Ex. 6 |
|---|---|---|---|---|---|---|
| 0 | 100 | 100 | 100 | 100 | 100 | 100 |
| 10 | 99.87 | 99.05 | 98.56 | 98.55 | 98.72 | |
| 15 | | | | | | 93.33 |
| 20 | 99.85 | 99.12 | 98.79 | n.a | 97.22 | |
| 30 | 99.84 | 99.07 | 98.91 | 98.1 | 97.28 | 93.53 |
| 40 | 99.85 | 99.08 | 98.49 | n.a | 95.69 | |
| 45 | | | | | | 94.49 |
| 50 | 99.73 | 98.81 | 98.36 | 97.41 | 94.87 | |
| 60 | 99.79 | 98.97 | 98.5 | 97.55 | 94.98 | 93.44 |

TABLE 5

Measurement of weight loss during/after hydrolytic degradation in days (d)

Sample weight as % of initial value

| Time (d) | Ex. 10 | Ex. 11 | Ex. 12 | Ex. 14 |
|---|---|---|---|---|
| 0 | 100 | 100 | 100 | 100 |
| 10 | 100 | 99.58 | 99.55 | 99.76 |
| 20 | 99.95 | 99.45 | 99.24 | 98.53 |
| 30 | 99.97 | 99.4 | 99.06 | 97.78 |
| 40 | 99.97 | 99.37 | n.a | n.a |
| 50 | 99.97 | 99.46 | 98.81 | n.a |
| 60 | 99.97 | 99.26 | 99.12 | n.a |

TABLE 6

Measurement of weight loss during/after hydrolytic degradation in days (d)

Sample weight as % of initial value

| Time (d) | Ex. 25 | Ex. 26 | Ex. 27 | Ex. 28 | Ex. 29 | Ex. 50 |
|---|---|---|---|---|---|---|
| 0 | 100 | 100 | 100 | 100 | 100 | 100 |
| 10 | 99.77 | 99.85 | 99.75 | 99.45 | 99.35 | 99.46 |
| 20 | 99.91 | 99.85 | 99.84 | 99.51 | 99.53 | 99.47 |
| 30 | 99.89 | 99.76 | 99.75 | 99.58 | 99.52 | 99.12 |
| 40 | 99.80 | 99.75 | 99.78 | 99.52 | 99.48 | 99.36 |
| 50 | 99.82 | 99.82 | 99.80 | 99.48 | 99.44 | 99.12 |
| 60 | 99.80 | 99.78 | 99.67 | 99.36 | 99.31 | 99.47 |

The following was found during the measurement of the hydrolytic degradability of Examples 35-49:

Examples 35-39, none of the measurements reached a value of ≤99.60% after 15 d, 30 d, 45 d or 60 d.

Examples 40-44, none of the measurements reached a value of ≤99.40% after 15 d, 30 d, 45 d or 60 d.

Examples 45-49, none of the measurements reached a value of ≤99.60% 15 d, 30 d, 45 d or 60 d.

The invention claimed is:

1. A two-component polyurethane adhesive composition consisting of a polyol component K1 and a polyisocyanate component K2;
   wherein:
      the polyol component K1 comprises castor oil A1 and 1,2,3-propanetriol A2,
      the polyisocyanate component K2 comprises at least one aromatic polyisocyanate B1,
      a ratio of the wt % of the castor oil A1 to the 1,2,3-propanetriol is 8-30,
      a ratio of a sum of all NCO groups of the aromatic polyisocyanate B1:a sum of all OH groups of the castor oil A1 and the 1,2,3-propanetriol A2=1.15:1-0.85:1,
      a sum of all OH groups of the castor oil A1 and the 1,2,3-propanetriol A2 is ≥99.5% of a sum of all OH groups of the two-component polyurethane adhesive composition, and
   wherein the two-component polyurethane adhesive composition is a hydrolytically degradable adhesive.

2. The two-component polyurethane adhesive composition according to claim 1, wherein the aromatic polyisocyanate B1 is
   MDI having ≥40 wt % monomeric MDI; and/or
   TDI having ≥40 wt % monomeric TDI, based on a total weight of said MDI and/or TDI.

3. The two-component polyurethane adhesive composition according to claim 1, wherein the ratio of the wt % of castor oil A1 to the 1,2,3-propanetriol is 8-20.

4. The two-component polyurethane adhesive composition according to claim 1, wherein a sum of the OH groups not originating from castor oil A1 and 1,2,3-propanetriol A2 is ≤0.5%, based on the sum of all OH groups of the two-component polyurethane adhesive composition.

5. The two-component polyurethane adhesive composition according claim 1, wherein a sum of the NCO groups not originating from aromatic polyisocyanate B1 is ≤5%, based on a sum of all NCO groups of the two-component polyurethane adhesive composition.

6. The two-component polyurethane adhesive composition according to claim 1, wherein an amount of a sum of the castor oil A1 and the 1,2,3-propanetriol A2 is ≥90 wt %, based on a total weight of the polyol component K1.

7. The two-component polyurethane adhesive composition according to claim 1, wherein an amount of the aromatic polyisocyanate B1 is ≥90 wt %, based on a total weight of the polyisocyanate component K2.

8. A method for bonding, comprising:
mixing the polyol component K1 and the polyisocyanate component K2 of the two-component polyurethane adhesive composition according to claim 1,
applying the mixed polyurethane adhesive composition to a surface of at least one substrate to be bonded,
joining the substrate and another substrate together within an open time, and
curing the two-component polyurethane adhesive composition.

9. The method according to claim 8, wherein the at least one substrate to be bonded comprises an organic material.

10. A bonded article formed by the method according to claim 8.

* * * * *